| | | | |
|---|---|---|---|
| (12) | United States Patent | (10) Patent No.: | US 8,493,745 B2 |
| | Co | (45) Date of Patent: | Jul. 23, 2013 |

(54) LOW-PROFILE MOTHERBOARD WITH SIDE-MOUNTED MEMORY MODULES USING A DUAL-OPENING EDGE CONNECTOR

(75) Inventor: Ramon S. Co, Trabuco Canyon, CA (US)

(73) Assignee: Kingston Technology Corp., Fountain Valley, CA (US)

( * ) Notice: Subject to any disclaimer, the term of this patent is extended or adjusted under 35 U.S.C. 154(b) by 102 days.

(21) Appl. No.: 13/269,526

(22) Filed: Oct. 7, 2011

(65) Prior Publication Data

US 2013/0088829 A1    Apr. 11, 2013

(51) Int. Cl.
    *H05K 7/00*    (2006.01)
(52) U.S. Cl.
    USPC ............................. 361/760; 361/748; 361/807
(58) Field of Classification Search
    USPC .................... 361/760, 748, 807, 781
    See application file for complete search history.

(56) References Cited

U.S. PATENT DOCUMENTS

| | | | |
|---|---|---|---|
| 6,246,588 B1 | 6/2001 | Kim et al. | |
| 6,480,014 B1 | 11/2002 | Li et al. | |
| 6,721,195 B2 | 4/2004 | Brunelle et al. | |
| 7,200,023 B2 | 4/2007 | Foster, Sr. | |
| 7,509,532 B2 | 3/2009 | Co et al. | |
| 7,692,930 B2 | 4/2010 | Petersen et al. | |
| 2009/0216924 A1 | 8/2009 | Bennett | |
| 2010/0323536 A1 | 12/2010 | Crane, Jr. et al. | |
| 2011/0053425 A1 | 3/2011 | Brunker et al. | |
| 2011/0085312 A1 | 4/2011 | Tang et al. | |
| 2011/0111614 A1 | 5/2011 | Kato | |
| 2011/0143579 A1 | 6/2011 | Karabatsos | |

*Primary Examiner* — Timothy Thompson
*Assistant Examiner* — Andargie M Aychillhum
(74) *Attorney, Agent, or Firm* — Stuart T. Auvinen; gPatent LLC

(57) ABSTRACT

A low-profile personal computer (PC) motherboard has memory modules mounted to an edge of the motherboard rather than mounted perpendicular using standard memory module sockets. The PC motherboard has a lower profile since memory module sockets are removed from the top surface of the PC motherboard. Expansion card sockets are also removed by integrating expansion functions into chips on the PC motherboard, or using an edge-mounted connector to the expansion card or to an external peripheral. Motherboard metal contacts are formed on an extended plug region near the edge of the PC motherboard. A first opening or slot of an edge connector fits over the motherboard metal contacts, while a second opening or slot of the edge connector fits over metal contacts on a standard memory module. The memory module and the PC motherboard each have printed-circuit boards (PCBs) that are in the same plane, thus reducing the overall height.

18 Claims, 7 Drawing Sheets

PRIOR ART

FRONT SIDE

LOW-PROFILE MOTHERBOARD WITH SIDE-MOUNTED MEMORY MODULES USING A DUAL-OPENING EDGE CONNECTOR

FIELD OF THE INVENTION

This invention relates to personal computer motherboards, and more particularly to thin motherboards with edge-mounted memory modules.

BACKGROUND OF THE INVENTION

Electronic systems such as personal computers (PC's) often use small printed-circuit board (PCB) daughter cards known as memory modules instead of directly mounting individual memory chips on a motherboard. The memory modules are built to meet specifications set by industry standards, thus ensuring a wide potential market.

Figure 1:
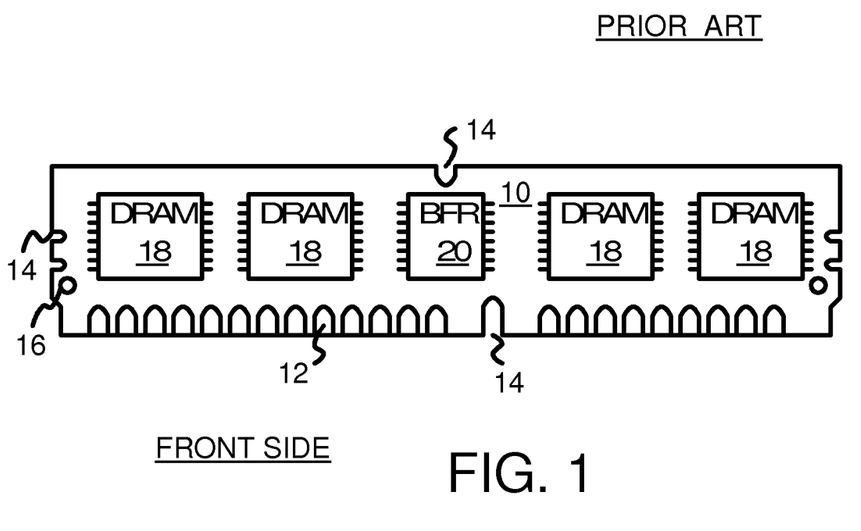
FIG. 1 shows a memory module.

FIG. 1 shows a memory module. Memory module 10 includes one or more dynamic-random-access memory (DRAM) chips 18 that are accessible through one or more rows of metal contacts 12 that fit into a socket on the PC motherboard. Memory module 10 also contains buffer chip 20. Notches 14 and hole 16 may be included to assist with alignment when inserting memory module 10 into a socket. Additional components such as capacitors (not shown) may also be present on the printed-circuit board (PCB) substrate of memory module 10.

Figure 2A:
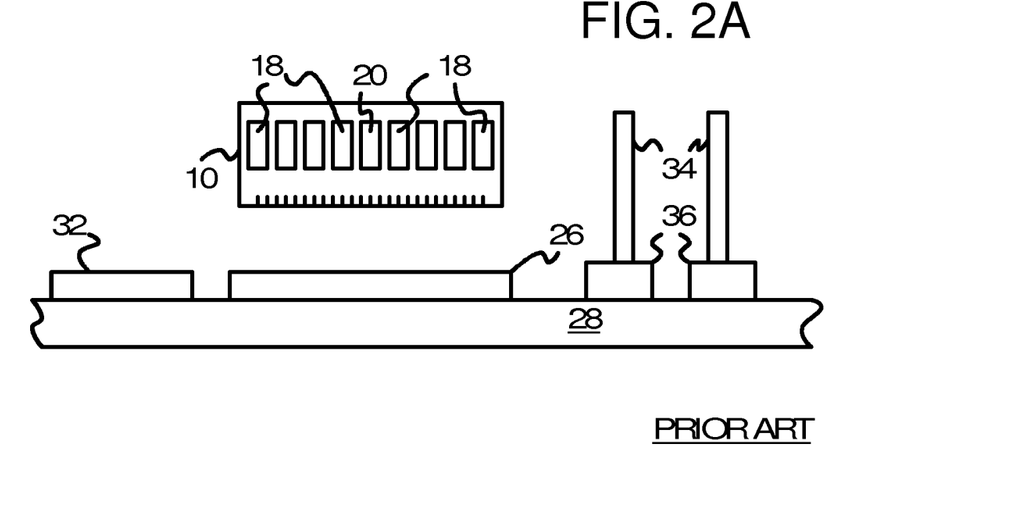
FIGS. 2A-B show a memory module being inserted into a memory module socket mounted to the top surface of a PC motherboard.
Figure 2B:
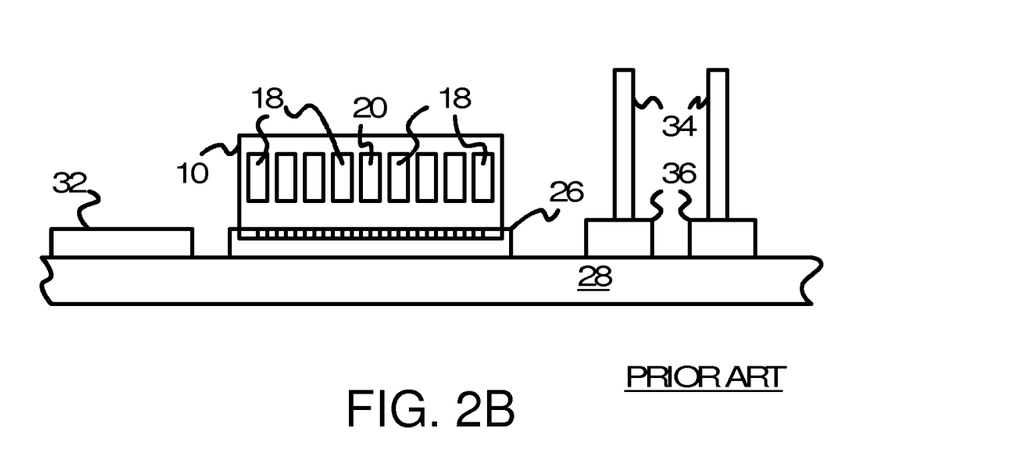

FIGS. 2A-B show a memory module being inserted into a memory module socket mounted to the top surface of a PC motherboard. In FIG. 2A, memory module 10 contains DRAM chips 18 and buffer chip 20.

PC motherboard 28 is a larger PCB than memory module 10. PC motherboard 28 has chips, sockets, and other components mounted thereon, such as chip 32 and expansion sockets 36 which have expansion cards 34 plugged in. Expansion cards 34 can be Peripheral Component Interconnect (PCI), PCI Express (PCIe), AT-bus, or other expansion cards. Chip 32 can be the main microprocessor, chip set, cache memory, or other chips.

Memory module socket 26 is one of several sockets designed to fit memory module 10 or other memory modules. Memory module socket 26 is mounted to the top flat surface of the PCB substrate of PC motherboard 28, and fits the contact pads on the bottom side of memory module 10. Typically there are two or four memory module sockets 26 on PC motherboard 28.

FIG. 2B shows the memory module plugged into the PC motherboard. The contact pads on memory module 10 fit into memory module socket 26 on PC motherboard 28. Electrical contact is made by memory module socket 26, with wiring traces and metal contacts 12 on memory module 10 passing most signals through from PC motherboard 28 to DRAM chips 18 on memory module 10.

While the standard PC motherboard with perpendicularly-mounted memory modules are useful, the overall height of PC motherboard 28 is increased by the perpendicular mounting of memory module 10 and memory module socket 26, which is mounted to the top surface of PC motherboard 28. Since expansion cards 34 are also mounted perpendicularly, and are much larger than memory module 10, memory module 10 appears to be insignificant. However, the functions performed by expansion cards 34 are often integrated onto chips 32 that are surface mounted to PC motherboard 28, so the need for expansion cards 34 is diminishing. Some systems may not require expansion cards 34.

Some systems have an ultra-thin height. For example, tablet computing devices (tablets) and ultrabooks require that the height be less than the height of a perpendicularly-mounted memory module. These devices may mount memory chips directly onto a motherboard rather than use plug-in memory modules. Thus the desirable aspects of removable memory modules such as ease of inserting different sizes of memory is lost.

Specialized systems such as servers, parallel processing systems, storage farms, or motherboard-based testers may include many PC motherboards 28 that are tightly packed together into a small volume of space. The pitch or spacing of an array of PC motherboards 28 stacked on top of each other in a rack may be limited by the height of each PC motherboard 28 and its components such as memory module 10. These systems may eliminate expansion cards 34 by integrating their functions onto PC motherboard 28. Thus the height of these systems may now be limited by memory module 10 inserted into memory module socket 26.

What is desired is a reduced-height PC motherboard. A low-profile motherboard is desired that still uses standard memory modules.

DETAILED DESCRIPTION

The present invention relates to an improvement in motherboards with memory modules. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
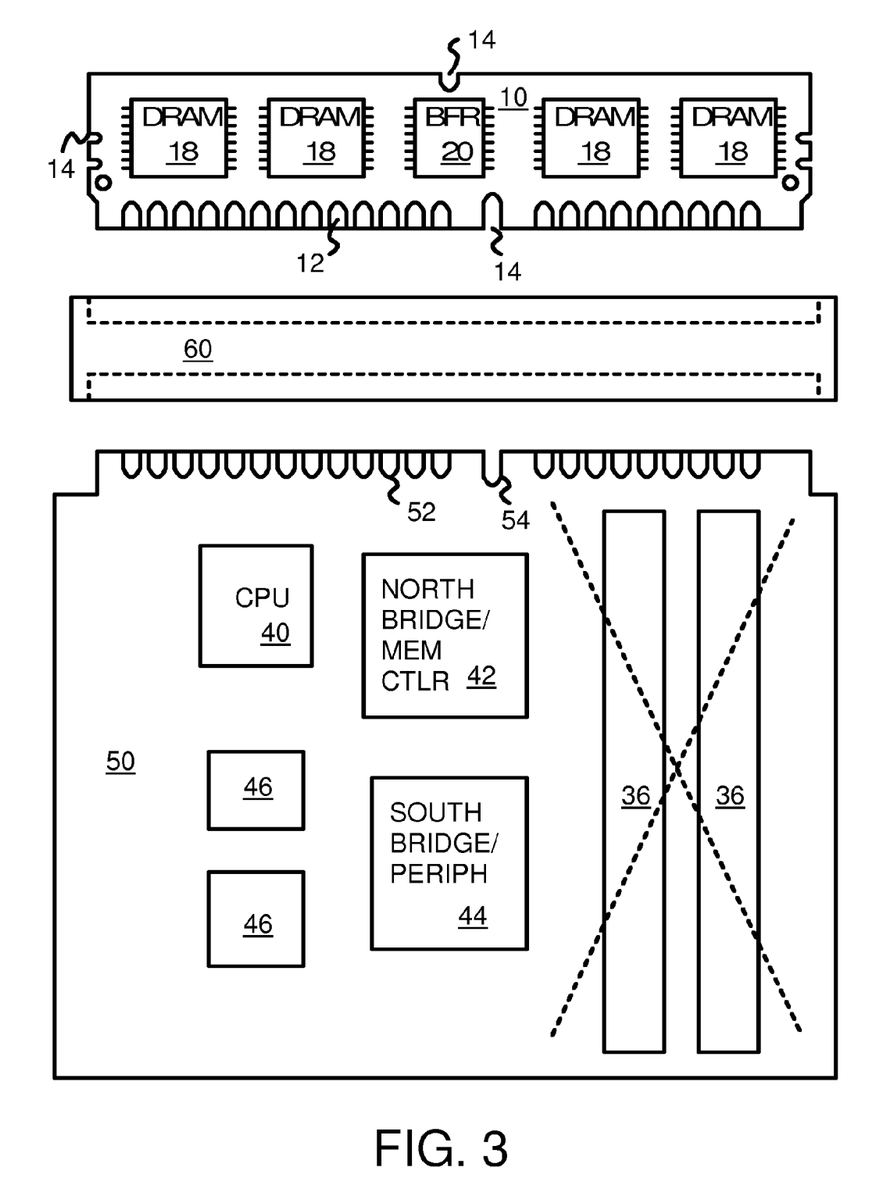
FIG. 3 shows a low-profile PC motherboard with an edge-mounted memory module.

FIG. 3 shows a low-profile PC motherboard with an edge-mounted memory module. PC motherboard 50 is a printed-circuit board (PCB) substrate with multiple layers or wiring traces sandwiched between rigid insulating layers such as fiberglass. Central Processing Unit (CPU) 40 is a microprocessor that executes programmable instructions and reads and writes memory. CPU 40 may also control chips 46 mounted to PC motherboard 50. North bridge memory controller 42 connects CPU 40 to a main memory of DRAM chips 18 on memory module 10. South bridge controller 44 extends commands from CPU 40 through north bridge memory controller 42 to peripherals that normally would be located on expansion cards 34 (not shown) inserted into expansion sockets 36. However, expansion sockets 36 are deleted. Instead, functions performed by expansion cards 34 are now performed by control chips 46 which may be accessed through south bridge controller 44.

Perpendicularly-mounted memory module sockets such as memory module socket 26 of FIG. 2 are also eliminated. Instead, motherboard metal contacts 52 are formed on the edge of the PCB substrate of PC motherboard 50. Wiring traces on PC motherboard 50 connect north bridge memory controller 42 to motherboard metal contacts 52. Memory modules are side mounted rather than top mounted.

Edge connector 60 has two slots that each accepts the edge of a PCB substrate. Edge connector 60 has one opening that accepts the edge of PC motherboard 50. Metal pads or spring clips inside the opening in edge connector 60 make contact with motherboard metal contacts 52 when PC motherboard 50 is inserted into edge connector 60.

Edge connector 60 has a second opening that accepts the edge of memory module 10. Metal pads or spring clips inside the opening in edge connector 60 make contact with metal contacts 12 on memory module 10 when memory module 10 is inserted into edge connector 60.

Notch 14 between metal contacts 12 on memory module 10 and notch 54 on PC motherboard 50 each fits over a rib member within the openings of edge connector 60. The rib members and notches 14, 54 are off-center so that edge connector 60 cannot be inserted in a reversed manner.

Figure 4:
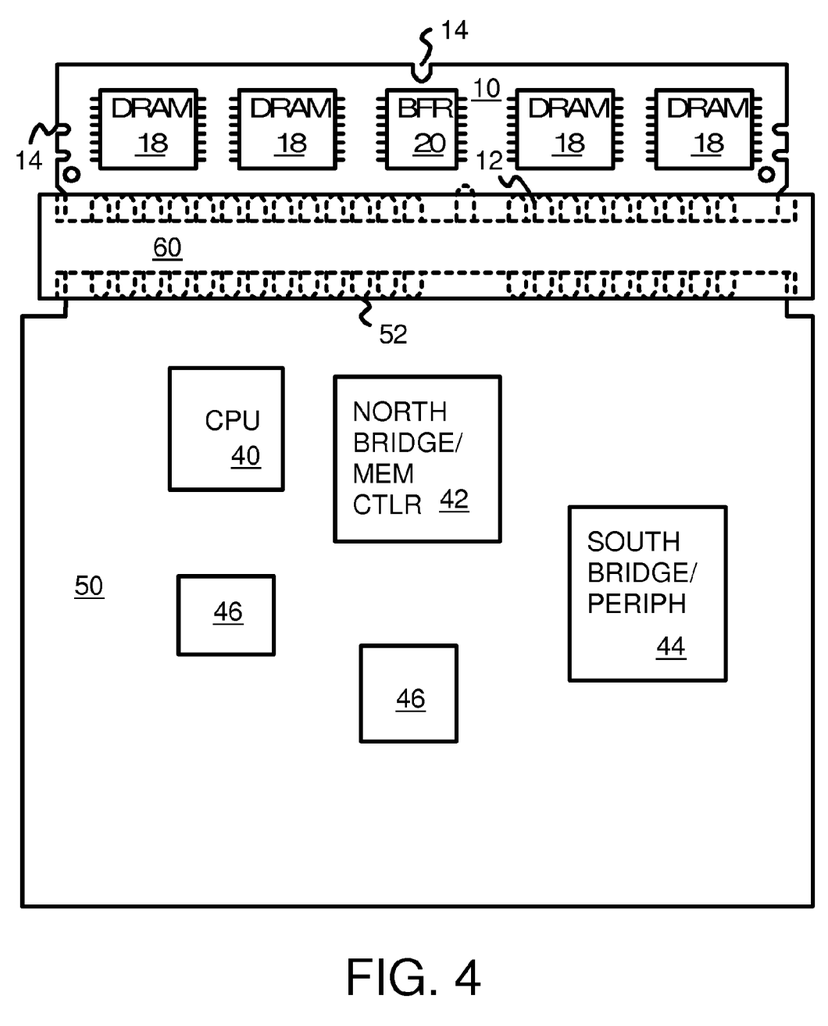
FIG. 4 shows a low-profile PC motherboard and a memory module inserted into an edge connector.

FIG. 4 shows a low-profile PC motherboard and a memory module inserted into an edge connector. Motherboard metal contacts 52 make contact with metal spring clips or pads inside one slot of edge connector 60 when PC motherboard 50 is fully inserted Likewise, metal contacts 12 on memory module 10 make contact with metal spring clips or pads inside the other slot of edge connector 60 when memory module 10 is fully inserted.

Figure 5:
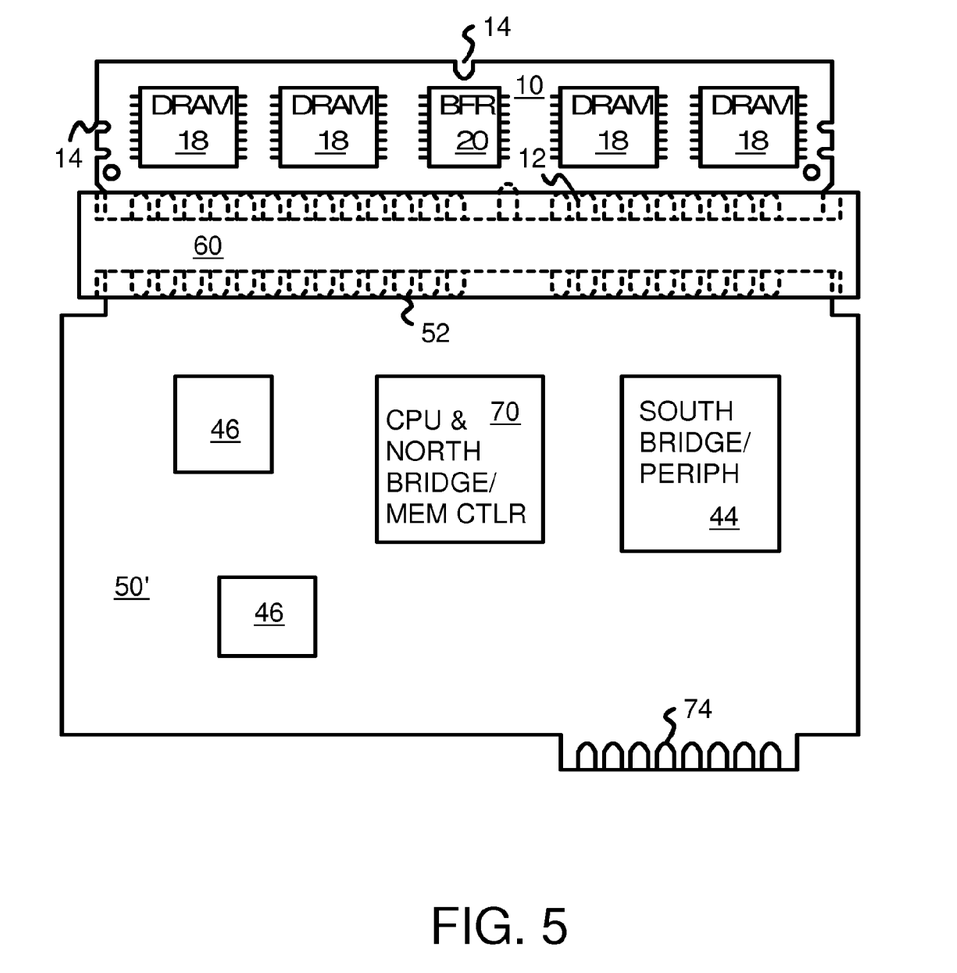
FIG. 5 shows a low-profile PC motherboard with peripheral pads for an edge-mounted peripheral.

FIG. 5 shows a low-profile PC motherboard with peripheral pads for an edge-mounted peripheral. Motherboard peripheral metal contacts 74 are formed on another edge of the PCB substrate PC motherboard 50'. Metal traces on PC motherboard 50' route signals from south bridge controller 44 to motherboard peripheral metal contacts 74 that would be routed to expansion socket 36 and expansion cards 34 in a typical PC motherboard, such as in FIG. 2A.

A smaller edge connector similar to edge connector 60 may be inserted over motherboard peripheral metal contacts 74. This edge connector may connect to a ribbon cable to a peripheral device such as a disk drive rather than to another PCB substrate.

Figure 6:
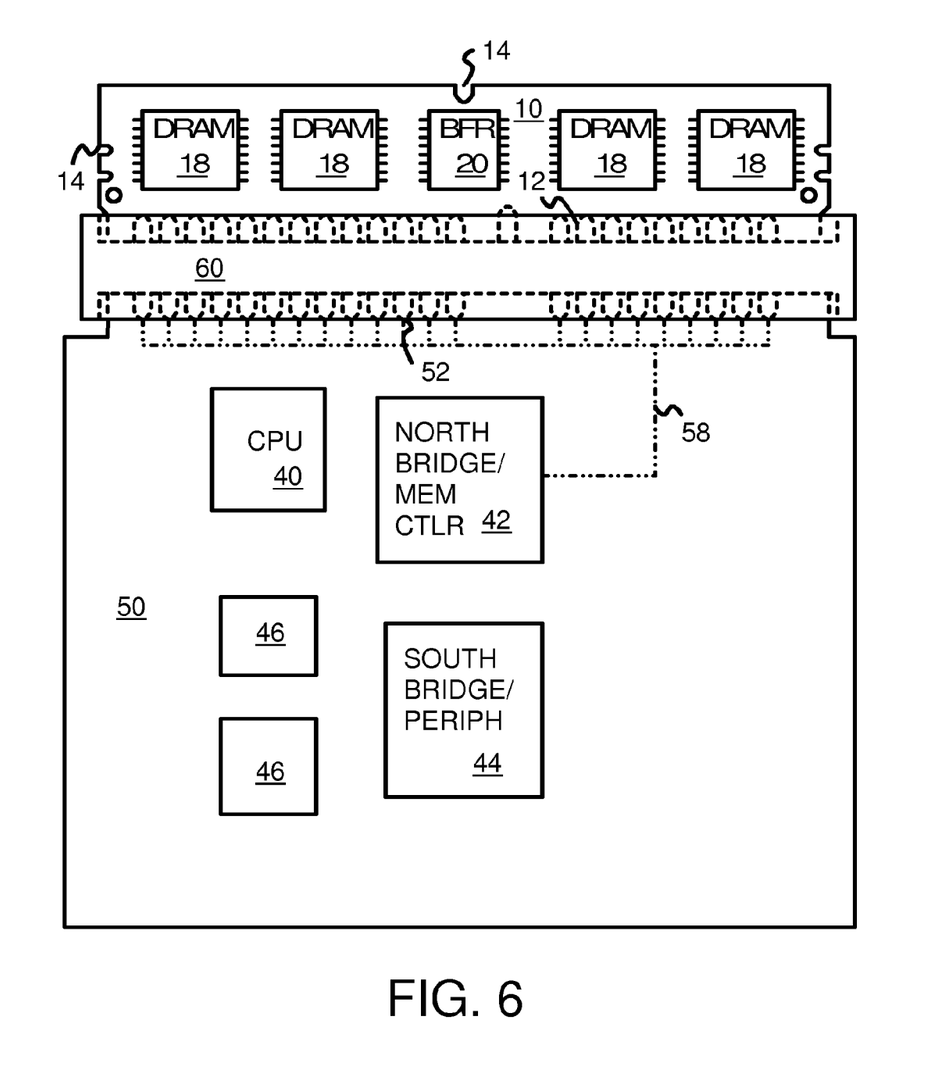
FIG. 6 highlights metal wiring traces on the PC motherboard that connect to the motherboard metal contacts that are inserted into the edge connector.

FIG. 6 highlights metal wiring traces on the PC motherboard that connect to the motherboard metal contacts that are inserted into the edge connector. Metal wiring traces 58 are formed on the flat surface of PC motherboard 50, or in metal layers between insulating layers of the PCB of PC motherboard 50. These metal wiring traces 58, along with metal connectors within edge connector 60 and metal traces on memory module 10 form a memory bus between north bridge memory controller 42 and DRAM chips 18 or buffer chip 20 on memory module 10. The memory bus can have data, address, and control lines.

Figure 7A:
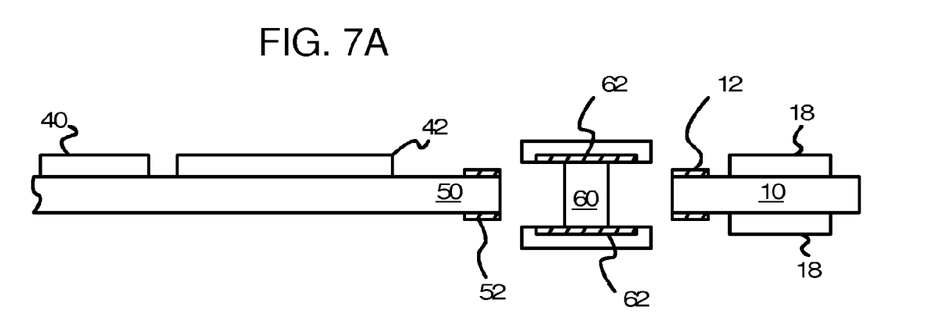
FIGS. 7A-C are cross-sectional views of the edge connector connecting the low-profile PC motherboard and the edge-mounted memory module.
Figure 7B:
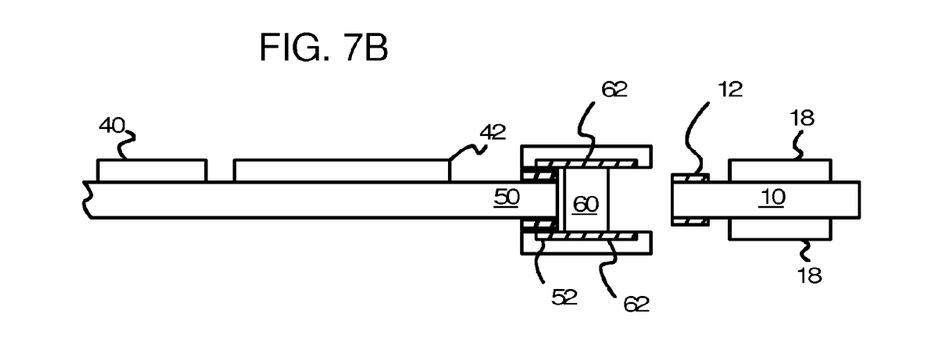
Figure 7C:
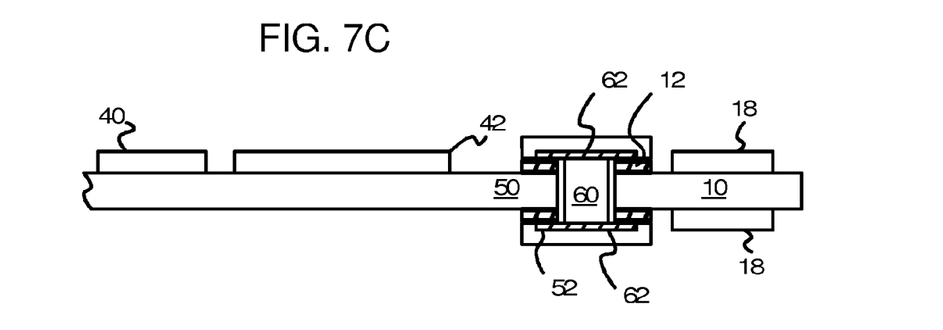

FIGS. 7A-C are cross-sectional views of the edge connector connecting the low-profile PC motherboard and the edge-mounted memory module. In FIG. 7A, PC motherboard 50 and memory module 10 have not yet been inserted into edge connector 60. Metal wiring traces on or within the PCB substrate of PC motherboard 50 connect north bridge memory controller 42 to motherboard metal contacts 52. DRAM chips 18 mounted on the PCB substrate of memory module 10 are connected to metal contacts 12 by metal wiring traces on or within the substrate of memory module 10.

Metal clips 62 are formed within edge connector 60 and provide electrical connection from one slot opening to the other slot opening of edge connector 60. Metal clips 62 can each have a spring clip on one end that engages motherboard metal contacts 52 when PC motherboard 50 is inserted into edge connector 60, and another spring clip on the other end to engage metal contacts 12 when memory module 10 is inserted.

In FIG. 7B, PC motherboard 50 has been inserted into edge connector 60. The slot opening of edge connector 60 fits over the edge of the PCB of PC motherboard 50. The fit is snug so that edge connector 60 does not fall off. Metal clips 62 inside edge connector 60 each have a spring clip on one end that engages motherboard metal contacts 52 when PC motherboard 50 is inserted into edge connector 60.

In FIG. 7C, memory module 10 has been inserted into edge connector 60. Edge connector 60 provides enough lateral stability to hold memory module 10 within the slot opening of edge connector 60, since the PCB edge of memory module 10 fits snugly within the opening of edge connector 60. There are many metal clips 62 within edge connector 60. Each metal clip 62 connects one motherboard metal contact 52 to one metal contact 12 on memory module 10 that are directly opposite each other.

Motherboard metal contacts 52 make contact with metal spring clips or pads such as metal clips 62 inside one slot of edge connector 60 when PC motherboard 50 is fully inserted. Likewise, metal contacts 12 on memory module 10 make contact with metal spring clips or pads such as metal clips 62 inside the other slot of edge connector 60 when memory module 10 is fully inserted.

Memory module 10 and PC motherboard 50 each have printed-circuit boards (PCBs) that are in the same plane. There can be a slight offset to edge connector 60 so that memory module 10 is in a parallel plane that is slightly offset from the plane or PC motherboard 50, but these can be considered co-planar when the offset is very small, such as less than 2 millimeters. Thus, a thin (small height) computer can be achieved using the low-profile PC motherboard with edge-mounted memory module. Many low-profile PC motherboards can also be stacked together in a smaller height chassis, reducing overall system volume.

Alternate Embodiments

Several other embodiments are contemplated by the inventor. For example some crossovers of metal clips 62 could be provided within edge connector 60, or one metal clip could connect to several pads, such as for ground pads. Metal clips 62 could have a variety of shapes and mechanisms to make physical and electrical contact with metal pads near the edge of the PCB of PC motherboard 50 and memory module 10. A single flat metal piece may be shaped to have ends that bend down toward the metal pads. This single flat metal piece may then be inserted between plastic groves inside edge connector 60 during its assembly. Many such flat metal pieces may be inserted during assembly of edge connector 60.

Rather than inserting PC motherboard 50 to one side of edge connector 60, the attachment can be made using metal contact pins. Metal contact pins from edge connector 60 can replace the edge mounting and surface mounted to PC motherboard 50. Through-hole mounting is also possible. Edge connector 60 may be permanently mounted to motherboard 50, such as by soldering.

The memory module may use nonvolatile memory devices such as flash memory rather than DRAM. The flash memory controller for controlling the flash memory devices may be placed in the memory module or may be located on PC motherboard 50.

The memory module may also contain additional components, such as passive capacitors and resistors, and active components such as buffer chips, and registers for buffering control, address, or data lines.

The PC motherboard can be a standard motherboard design that is modified to remove memory module sockets and expansion card sockets, and have motherboard metal contacts 52 formed on extended plug regions that are sized to fit into edge connector 60. A single PC motherboard 50 may have two or more such extended plug regions, either on one side edge or one two side edges of PC motherboard 50 to allow two or more memory modules 10 to be inserted, each into a separate edge connector 60. Additional extended plug regions may be added for expansion cards, such as to receive a ribbon cable connector to a disk drive.

The PC motherboard can be one of several in a larger test system, such as in a robotic test system. A handler can automatically insert and remove the memory modules being tested, or a robotic arm or human operator can handle the memory modules under test. Edge connector 60 may be a specialized test socket, and may have a movable arm or other mechanism to aid insertion and removal of memory module 10.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A low-profile personal computer motherboard comprising:
a personal computer motherboard having a motherboard substrate; chips mounted on the personal computer motherboard including a processor chip; motherboard metal contacts formed along a first edge of the motherboard substrate; an edge connector having a first opening that is sized to receive the first edge of the motherboard substrate; a memory module having memory chips mounted to a memory module substrate; metal contacts formed along an insertion edge of the memory module substrate; wherein the edge connector further comprises a second opening that is sized to receive the insertion edge of the memory module substrate; metal clips, within the edge connector, that make physical and electrical contact with the motherboard metal contacts when the motherboard substrate is inserted into the first opening, and make physical and electrical contact with the metal contacts when the memory module substrate is inserted into the second opening, the metal clips having interconnect to electrically connect metal contacts from the memory module substrate to the motherboard metal contacts when both the memory module substrate and the motherboard substrate are inserted into the edge connector, whereby the memory module is edge-mounted to the personal computer motherboard, wherein the motherboard substrate is a multi-layer printed-circuit board (PCB) having metal layers sandwiched between insulating layers, wherein a height of the personal computer motherboard and all components mounted thereon is less than a height of a memory module inserted into a memory module socket that is mounted to a top surface of a standard motherboard, whereby height is reduced by edge mounting the memory module using the edge connector.

2. The low-profile personal computer motherboard of claim 1 wherein the memory module substrate and the motherboard substrate are in a same plane.

3. The low-profile personal computer motherboard of claim 2 further comprising:
a north bridge memory controller mounted to the motherboard substrate;
wiring traces formed on and within the motherboard substrate, for connecting the north bridge memory controller to the motherboard metal contacts.

4. The low-profile personal computer motherboard of claim 3 further comprising:
a first rib formed within the first opening of the edge connector;
a notch formed on the first edge of the motherboard substrate, the notch fitting around the first rib when the motherboard substrate is inserted into the first opening of the edge connector.

5. The low-profile personal computer motherboard of claim 4 wherein the notch is formed between the motherboard metal contacts.

6. The low-profile personal computer motherboard of claim 5 wherein the notch is formed between a first group of the motherboard metal contacts and a second group of the motherboard metal contacts, wherein the first group has a larger number of motherboard metal contacts than does the second group, wherein the notch is formed off-center between the motherboard metal contacts.

7. The low-profile personal computer motherboard of claim 3 further comprising:

a second edge of the motherboard substrate;

motherboard expansion metal contacts formed along the second edge of the motherboard substrate;

a peripheral controller chip mounted to the motherboard substrate;

peripheral bus metal traces formed on or within the motherboard substrate, for connecting the peripheral controller chip to the motherboard expansion metal contacts;

wherein a peripheral is edge connected.

8. The low-profile personal computer motherboard of claim 7 wherein the first edge of the motherboard substrate includes an extended plug region that the motherboard metal contacts are formed on, the extended plug region extending from a receded first edge that is parallel to the first edge of the motherboard substrate, wherein the extended plug region is inserted into the first opening of the edge connector while the receded first edge is not inserted into the first opening.

9. The low-profile personal computer motherboard of claim 8 wherein the memory chips mounted to the memory module substrate comprise dynamic-random-access memory (DRAM) chips.

10. An edge-connected motherboard comprising:

a motherboard substrate;

a memory controller mounted to the motherboard substrate;

metal wiring traces formed on the motherboard substrate;

an extended plug section of the motherboard substrate;

motherboard metal contacts formed on the extended plug section along a first edge;

wherein the metal wiring traces connect the memory controller to the motherboard metal contacts;

an edge connector having a first opening sized to accept the extended plug section of the motherboard substrate and having a second opening sized to accept an insertable edge of a memory module;

first internal pads inside the edge connector that mate with the motherboard metal contacts when the extended plug section is inserted into the first opening;

second internal pads inside the edge connector that mate with memory module metal contacts when the insertable edge of a memory module is inserted into the second opening; and internal interconnect within the edge connector that connect the first internal pads to the second internal pads.

11. The edge-connected motherboard of claim 10 wherein memory modules are only connected to the motherboard substrate along edges of the motherboard substrate and not on a top surface of the motherboard substrate;

wherein a top surface and a bottom surface of the motherboard substrate are absent any memory module sockets;

wherein all memory modules lie in a same plane as the motherboard substrate.

12. The edge-connected motherboard of claim 11 wherein the memory controller further comprises a north bridge memory controller coupled to a central processing unit (CPU).

13. The edge-connected motherboard of claim 11 wherein the memory controller connects to the memory module through the edge connector without connecting to any memory modules mounted to sockets on a top surface of the motherboard substrate, wherein a height of the edge-connected motherboard is not determined by any memory module socket on the top surface of the motherboard substrate, whereby the height of the edge-connected motherboard is not limited by memory modules.

14. The edge-connected motherboard of claim 11 wherein the motherboard substrate is a printed-circuit board (PCB).

15. The edge-connected motherboard of claim 11 further comprising:

a first rib formed within the first opening of the edge connector;

a notch formed on the first edge of the motherboard substrate, the notch fitting around the first rib when the motherboard substrate is inserted into the first opening of the edge connector.

16. The edge-connected motherboard of claim 15 wherein the notch is formed between a first group of the motherboard metal contacts and a second group of the motherboard metal contacts, wherein the first group has a larger number of motherboard metal contacts than does the second group, wherein the notch is formed off-center between the motherboard metal contacts.

17. The edge-connected motherboard of claim 10 further comprising:

a second edge of the motherboard substrate;

motherboard expansion metal contacts formed along the second edge of the motherboard substrate;

a peripheral controller chip mounted to the motherboard substrate;

peripheral bus metal traces formed on the motherboard substrate, that connect the peripheral controller chip to the motherboard expansion metal contacts;

wherein a peripheral is edge connected.

18. A low-profile edge-connected motherboard comprising:

a motherboard substrate that supports electronic chips' a memory controller mounted to the motherboard substrate, that generates signals to access a main memory in a memory module;

metal wiring traces, formed on the motherboard substrate that carry the signals generated by the memory controller;

an extended plug section that extends the motherboard substrate;

motherboard metal contacts formed on the extended plug section along a first edge, that externally couple the metal wiring traces carrying the signals generated by the memory controller;

an edge connector that couples the motherboard substrate to the memory module, the edge connector having a first opening sized to accept the extended plug section of the motherboard substrate and having a second opening sized to accept an insertable edge of a memory module;

first internal pads inside the edge connector, that make electrical contact with the motherboard metal contacts when the extended plug section is inserted into the first opening;

second internal pads inside the edge connector that make electrical contact with metal contacts on the memory module when the insertable edge of the memory module is inserted into the second opening; and an internal interconnect, within the edge connector that connects the first internal pads to the second internal pads;

wherein the memory module and the motherboard substrate are in a same plane.

\* \* \* \* \*